(12) United States Patent
Dalla Valle et al.

(10) Patent No.: US 9,216,378 B2
(45) Date of Patent: Dec. 22, 2015

(54) METHOD FOR COOL DRYING GAS

(75) Inventors: Monica Dalla Valle, Chiampo (IT); Wouter Denis Ann Van Dijck, Meise (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 2205 days.

(21) Appl. No.: 11/921,957

(22) PCT Filed: Apr. 28, 2006

(86) PCT No.: PCT/BE2006/000041
§ 371 (c)(1),
(2), (4) Date: Jan. 24, 2008

(87) PCT Pub. No.: WO2006/133522
PCT Pub. Date: Dec. 21, 2006

(65) Prior Publication Data
US 2009/0229279 A1    Sep. 17, 2009

(30) Foreign Application Priority Data
Jun. 17, 2005  (BE) .................................. 2005/0310

(51) Int. Cl.
*F25B 17/06*    (2006.01)
*B01D 53/26*    (2006.01)

(52) U.S. Cl.
CPC .................................... *B01D 53/265* (2013.01)

(58) Field of Classification Search
CPC .............................. B01D 5/0039; B01D 53/265
USPC .............. 62/90, 92–93, 173, 176.6, 229, 129, 62/228.1, 515; 37/470–471, 474; 236/44 C; 364/105, 106, 111, 119, 121; 318/561, 562, 636; 417/228, 313; 700/31, 37, 41–42
See application file for complete search history.

(56) References Cited

U.S. PATENT DOCUMENTS

| | | | | |
|---|---|---|---|---|
| 4,232,364 A * | 11/1980 | Bibbero | ........................... | 700/32 |
| 5,752,385 A * | 5/1998 | Nelson | ................................. | 62/6 |
| 6,393,850 B1 * | 5/2002 | Vanderstraeten | ............ | 62/196.3 |
| 6,460,359 B1 * | 10/2002 | Lauwers | ........................ | 62/227 |
| 6,501,998 B1 * | 12/2002 | Pfeiffer | ........................... | 700/37 |
| 6,745,581 B2 * | 6/2004 | King et al. | ..................... | 62/131 |

FOREIGN PATENT DOCUMENTS

EP    1 103 296 A1    5/2001

* cited by examiner

*Primary Examiner* — Emmanuel Duke
(74) *Attorney, Agent, or Firm* — Bacon & Thomas, PLLC

(57) ABSTRACT

Method for cool drying gas, in particular air, whereby this gas is guided through the secondary part of a heat exchanger (2) whose primary part is the vaporizer (3) of a cooling circuit (4), which consists in measuring the ambient temperature (Tamb), as well as the lowest gas temperature (LAT) or the dew point, and to switch the cooling circuit (4) on and off on the basis of these measurements in order to always maintain the lowest gas temperature (LAT) or the dew point between a pre-determined minimum and maximum threshold value, and whereby pre-determined threshold values are calculated on the basis of an algorithm which is a function of the measured ambient temperature (Tamb).

8 Claims, 1 Drawing Sheet

METHOD FOR COOL DRYING GAS

FIELD OF THE INVENTION

The present invention concerns an improved method for cool drying.

In particular, the present invention concerns a method for cool drying gas, in particular air, containing water vapour, whereby this gas is guided through the secondary part of a heat exchanger whose primary part is the vaporizer of a cooling circuit which also comprises a compressor which is driven by a motor; a condenser; an expansion means between the outlet of the condenser and the inlet of the above-mentioned vaporizer.

BACKGROUND

Such methods are used among others for drying compressed air.

Compressed air which is supplied for example by a compressor is in most cases saturated with water vapour or, in other words, has a relative humidity of 100%. This means that in case of a temperature drop below what is called the dew point, there will be condensation. The condensed water gives rise to corrosion in pipes and tools, and appliances may wear prematurely.

That is why compressed air is dried, which may be done in the above-mentioned manner by means of cool drying. Also other air than compressed air or other gases may be dried in this manner.

Cool drying is based on the principle that by lowering the air or gas temperature in the vaporizer, moisture in the air or gas will condense, after which the condensed water is separated in a liquid separator and after which the air or gas is heated again, such that this air or gas will be no longer saturated.

The same applies to any other gas than air, and each time we hereafter refer to air, the same also applies to any other gas than air.

A method for cool drying is already known, whereby on the basis of measurements of the vaporizer pressure or the vaporizer temperature, the cooling circuit is switched on or off.

If a take-off of compressed air is recorded, the cooling circuit is started and as soon as the take-off of compressed air stops again, the cooling circuit is stopped again as well.

A disadvantage of such a known method is that the heat exchanger, after the cooling circuit has been switched off, will heat up as there is no cooling any more.

When, subsequently, compressed air is taken off again while the heat exchanger is still relatively warm, temperature and dew point peaks may instantly occur in the supplied compressed air, since the gas to be dried in the heat exchanger is not sufficiently cooled then to make the water in said gas to be dried condense at maximum capacity.

A method for cool drying is known as well, whereby the cooling circuit stays operational at all times, also when there is no take-off of compressed air.

A major disadvantage of such a method is that it requires a considerable amount of energy, as the cooling circuit stays continuously operational, also in case of idle running.

A method for cool drying is also known whereby use is made of a thermal mass. With such a known method, use is made of an intermediary thermal mass, for example in the form of a mixture of water and propylene glycol, for cooling the compressed air.

Since the cooling circuit is only used for cooling the above-mentioned thermal mass, the compressor in this cooling circuit can be switched off as soon as the thermal mass has reached a certain temperature, such that energy can be saved.

A disadvantage of such a known method is that the cooling circuit, due to the presence of the above-mentioned thermal mass, must be made very heavy and sizeable.

Another disadvantage of such a known method is that, due to additional parts such as a reservoir and/or an additional heat exchanger, the construction of the cooling circuit is relatively expensive and complicated and its assembly is very time-consuming.

SUMMARY

The present invention aims to remedy one or several of the above-mentioned and other disadvantages.

To this end, the present invention concerns a method as described above, which consists, at least when no gas to be dried is supplied, in measuring the ambient temperature as well as the temperature or the dew point in the vicinity of the place where the temperature of the gas to be dried is the lowest when cool drying, and to switch the cooling circuit on and off on the basis of these measurements so as to always maintain the lowest gas temperature or the dew point between a pre-determined certain minimum and maximum threshold value, whereby one or both of the above-mentioned pre-determined threshold values are calculated on the basis of an algorithm which is a function of the measured ambient temperature (Tamb).

By the lowest air temperature or LAT is meant here the lowest temperature of the air to be dried which occurs during cool drying and which is in principle reached at the outlet for the gas to be dried of the secondary part of the heat exchanger. The LAT always gives a good indication of the dew point of the air, since there is a connection between both.

An advantage of such a method according to the invention is that no extra thermal mass is required and that energy can be saved in a very simple manner, since the cooling circuit is switched off in due time, for example when no compressed air needs to be dried since there is no consumption of compressed air.

Another advantage of such a method is that the temperature of the heat exchanger is always restricted, since the cooling circuit is started again when the measured LAT or the dew point becomes too high, and thus peaks are avoided.

Since the pre-determined threshold values are calculated on the basis of an algorithm which is a function of the measured ambient temperature, a dew point is guaranteed at any ambient temperature which is sufficiently low to avoid corrosion or condensate in the compressed air network following the device for cool drying.

BRIEF DESCRIPTION OF THE DRAWINGS

In order to better explain the characteristics of the present invention, the following preferred method according to the invention is given as an example only, with reference to the accompanying drawings, in which.

DETAILED DESCRIPTION

Figures 1, 2:
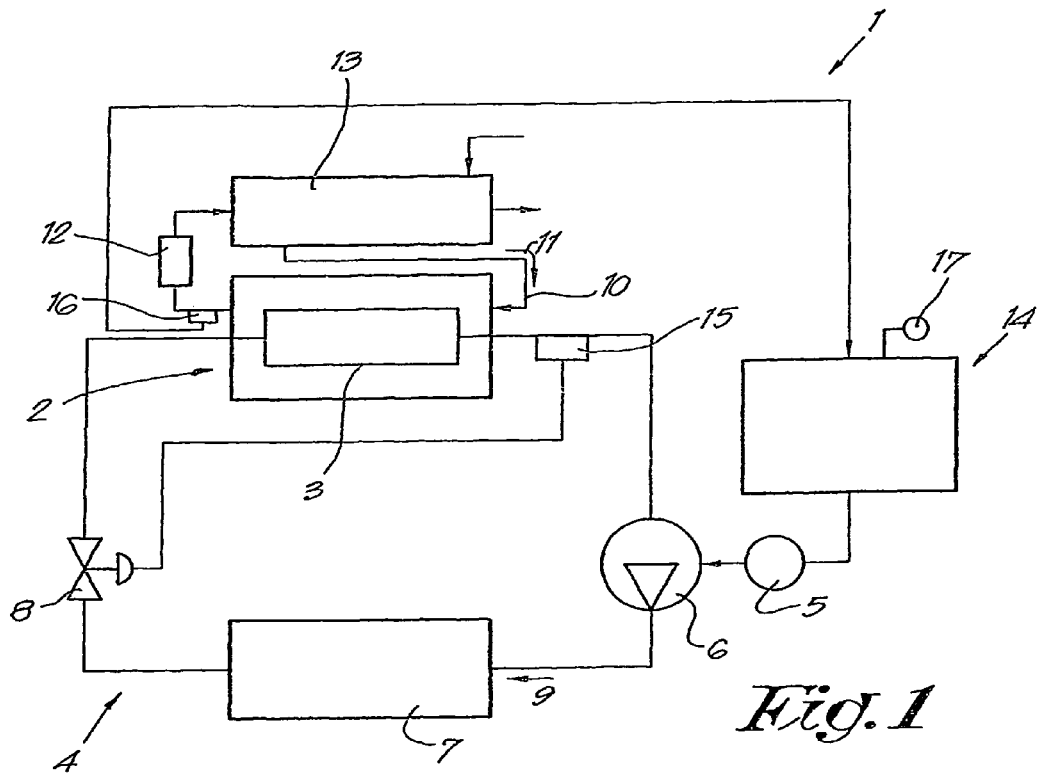
FIG. 1 represents a device for applying a method according to the invention for cool drying.
FIG. 2 schematically represents the course of the threshold values as a function of the ambient temperature.

FIG. 1 represents a device 1 for cool drying which mainly consists of a heat exchanger 2 whose primary part forms the vaporizer 3 of a cooling circuit 4 in which are successively also erected a compressor 6, a condenser 7 and an expansion valve 8, driven by a motor 5.

This cooling circuit is filled with cooling fluid, for example Freon R404a, whose stream direction is represented by arrow 9.

The secondary part of the heat exchanger 2 is part of the pipe 10 for humid air to be dried whose stream direction is represented by arrow 11.

After the heat exchanger 2, i.e. at its outlet, is erected a liquid separator 12 in the pipe 10.

This pipe 10, before reaching the heat exchanger 2, may extend partly through a pre-cooler or a recuperation heat exchanger 13 and then, following the liquid separator 12, extend through the recuperation heat exchanger 13 again, in parallel flow or counter flow to the above-mentioned part.

The outlet of the above-mentioned pipe 10 can for example be connected to a compressed air network which is not represented in the figures, to which consumers of compressed air are connected, for example tools that are driven by compressed air.

The heat exchanger 2 is a liquid/air heat exchanger and may be designed as forming a whole with the possible recuperation heat exchanger 13 which is an air/air heat exchanger.

The expansion valve 8 is in this case made in the shape of a thermostatic valve whose thermostatic element is coupled in the known manner by means of a pipe to a bulb 15 provided at the outlet of the vaporizer 3, in other words between the vaporizer 3 and the compressor 6, on the cooling circuit 4 and filled with the same cooling medium.

It is clear that the above-mentioned expansion valve 8 can be realised in many different ways, such as for example in the form of an electronic valve which is coupled to a temperature gauge erected on the far end of the vaporizer 3 or following it.

In some small cool dryers 1, the expansion valve 8 may be replaced by a capillary tube.

The compressor 6 is for example a volumetric compressor which, at the same rotational speed, delivers practically the same volume flow, for example a spiral compressor, whereas the motor 5 is an electric motor in this case which is coupled to a control device 14.

The above-mentioned control device 14, which may be realised for example in the form of a PLC, is also connected to measuring devices 16 for the LAT and to measuring devices 17 for the ambient temperature.

The above-mentioned measuring devices 16 for the LAT are preferably provided on the spot where the lowest air temperature can be actually expected, which is in this case right after the secondary part of the heat exchanger 2 and preferably before the liquid separator 12.

According to the invention, it is not excluded that the measuring devices 16 for measuring the LAT are replaced by measuring devices for measuring the dew point, which are preferably provided near the outlet of the secondary part of the above-mentioned heat exchanger 2. Each time measuring devices 16 for measuring the LAT are mentioned hereafter, also measuring devices for measuring the dew point can be applied according to the invention.

The above-mentioned measuring devices 17 for measuring the ambient temperature are preferably placed at the compressed air network which makes use of the air dried by the device 1, in particular at the height of the end consumers of this compressed air, for example near the tools which are driven by this dried compressed air.

Alternatively, the measuring devices 17 can also be provided in other places. In case the compressed air to be dried comes for example from a compressor, it turns out that a good positioning for the above-mentioned measuring devices 17 for the ambient temperature is at the inlet of such a compressor.

The improved method according to the invention is very simple and as follows.

The air to be dried is guided through the pipe 10 and thus through the heat exchanger 2, for example counter flow to the cooling fluid in the vaporizer 3 of the cooling circuit 4.

In this heat exchanger 2, the damp air is cooled, as a result of which condensate is formed which is separated in the liquid separator 12.

The cold air, which contains less moisture in absolute terms after said liquid separator 12, but still has a relative humidity of 100%, is heated in the recuperation heat exchanger 13, as a result of which the relative humidity decreases to preferably less than 50%, whereas the fresh air to be dried is already partly cooled in the recuperation heat exchanger 13 before being supplied to the heat exchanger 2.

Thus, the air at the outlet of the recuperation heat exchanger 13 is drier than at the inlet of the heat exchanger 2.

The LAT is preferably maintained within certain limits, so as to prevent freezing of the vaporizer 3 due to a too low LAT on the one hand, and to make sure that the air is still sufficiently cooled so as to allow for condensation on the other hand.

To this end, the cooling circuit 4 according to the invention can be switched on and off on the basis of measurements of the LAT and the ambient temperature, for example by switching on and off the driving motor 5 of the compressor 6 of this cooling circuit 4.

In this manner, one can make sure that the LAT or the dew point is always situated between a predetermined minimum threshold value A and a maximum threshold value B.

This regulation is not only applied according to the invention while drying the air, but also during the periods in which no air to be dried is being supplied and the cooling circuit 4 could be switched off in theory, as is the case with the known cool dryers.

In particular, the method according to the invention is at least applied when no gas to be dried is being supplied and if need be also when gas to be dried is being supplied.

To this end, the temperature or the dew point is measured in the vicinity of the place where the temperature of the gas to be dried is the lowest when cool drying, and preferably immediately after the secondary part of the heat exchanger 2.

Preferably, one or both of the above-mentioned threshold values A and/or B are calculated on the basis of an algorithm which is a function of the measured ambient temperature Tamb.

FIG. 2 schematically represents a possible connection between the ambient temperature Tamb and the above-mentioned minimum and maximum threshold values A, B respectively.

As is represented, the algorithm of the minimum threshold value A is preferably formed by a step function which, when the ambient temperature is smaller than a first set value Ta, is constant, and in this case amounts to practically 4° C., so as to prevent freezing of the vaporizer 3.

When the ambient temperature Tamb is higher than a second set value Tb, which is higher than the above-mentioned first set value Ta, the above-mentioned step function will be constant as well in this case.

Between the above-mentioned set values Ta and Tb, the above-mentioned step function of the algorithm of the minimum threshold value A has an ascending course which in this case, but not necessarily, is linear and which is also preferably such that the difference between the ambient temperature and said calculated minimum threshold value A is constant and preferably amounts to at least 10° Celsius.

In this case, the algorithm of the maximum threshold value B is also formed by a step function which has a greater value than the step function of the above-mentioned minimum threshold value A at any value of the ambient temperature Tamb and which, when the ambient temperature Tamb is smaller than a first set value Tc, is constant.

The first set value Tc of the step function of the maximum threshold value B in this case coincides with the above-mentioned first set value Ta of the step function of the minimum threshold value A, but this is not required according to the invention.

As soon as an ambient temperature Tamb is higher than a second set value Td, the above-mentioned step function of the maximum threshold value B will be constant as well in this case, but it may also have a different course according to the invention.

Between the above-mentioned set values Tc and Td, the above-mentioned step function of the algorithm of the maximum threshold value B also has an ascending course which, in this case but not necessarily, is linear, and which is also preferably such that its course is steeper than the course of the above-mentioned ascending function of the minimum threshold value A.

The aim of the above-mentioned maximum threshold value B consists in avoiding that the LAT gets too high, as a result of which the air would not be sufficiently cooled and as a result of which not enough moisture would condense so as to be able to dry the air.

Preferably, according to the invention, while the device 1 for cool drying is operational, the measured value of the LAT is continuously compared by the above-mentioned control means 14 or compared at certain, either or not regular, intervals to the above-mentioned minimum threshold value A and the maximum threshold value B.

When the LAT temporarily drops under the minimum threshold value A, the above-mentioned control device 14 will switch off the cooling circuit 4, by switching off the motor 5 which drives the compressor 6 of this cooling circuit 4, such that the temperature in the above-mentioned heat exchanger 7 rises and also the LAT will increase again.

When the measured LAT rises above the maximum threshold value B, the cooling circuit 4 is switched on again, as the motor 5 which drives the compressor 6 of this cooling circuit 4 is switched on again, as a result of which the temperature in the vaporizer 3 decreases and also the LAT drops again.

Since the cooling circuit 4 is only switched on when this is required, a method for cool drying according to the invention will help to save energy.

By switching on the cooling circuit 4 again in due time, one also makes sure that the heat exchanger 2 does not heat up, such that when the compressed air supply is loaded again, for example after a standstill, there can be no temperature and dew point peaks in the compressed air being taken off.

The working of the cooling circuit 4 is already known as such and it is as follows.

In the condenser 7, the gaseous cooling fluid which is heated by the compression in the compressor 6, is cooled until it becomes liquid. In order to discharge the heat to the environment, use can for example be made of a fan or a cooling medium which is not represented in the figure, such as for example water.

Thanks to the expansion valve 8, the liquid cooling fluid expands to a constant vaporizer pressure, which of course implies a temperature drop.

By applying a thermostatic expansion valve 8, there will always be overheating after the vaporizer 3, such that there is no danger of cooling fluid entering the compressor 6, and, as a consequence, there is no need for a liquid separator in the cooling circuit 4.

Said overheating is measured in the known manner by distracting the temperature measured by the bulb 15 from the vaporizer temperature, in this case measured after the vaporizer 3. This difference is compared to a set value by the expansion valve 8, and in case of a difference, the expansion valve 8 will adjust it by opening or closing.

According to the invention, it is not excluded for a fan taking care of the heat dissipation from the condenser 7, to be started and stopped as well by the above-mentioned control means 14, as a function of the measurements of the ambient temperature Tamb and the LAT or the dew point, such that energy can be saved here as well.

Preferably, after the above-mentioned cooling circuit 4 has been switched off, a certain minimum time interval is taken into account before the cooling circuit 4 can be started again.

Thus is avoided that the above-mentioned motor 5, which can be realised for example as an electric motor, would become overloaded due to heat accumulation in the windings.

Instead of damp air, other gas than air containing water vapour can be dried in the same manner and with the same device. The LAT is the lowest gas temperature then.

The present invention is by no means limited to the method described as an example; on the contrary, such an improved method according to the invention for cool drying can be realised in many different ways while still remaining within the scope of the invention.

The invention claimed is:

1. Method for cool drying gas comprising the steps:
   guiding a gas through a secondary part of a heat exchanger whose primary part is a vaporizer of a cooling circuit that includes a compressor driven by a motor, a condenser, and an expansion device between an outlet of the condenser and an inlet of the vaporizer;
   measuring an ambient temperature, at least when no gas to be dried is being supplied, as well as a temperature or a dew point in a vicinity of the place where the temperature of the gas to be dried is the lowest when cool drying; and
   switching the cooling circuit on and off on the basis of these measurements in order to always maintain the lowest gas temperature or the dew point between a pre-determined minimum and maximum threshold value;
   wherein one or both of the pre-determined threshold values are calculated on the basis of an algorithm which is a function of the measured ambient temperature;
   wherein the algorithm of the minimum threshold value as the function of the ambient temperature is formed by a step function with a constant value when the measured ambient temperature is smaller than a first set value; a higher constant value for an ambient temperature that is larger than a second set value which is larger than the first set value; and a rising function between said set values;
   wherein the algorithm of the maximum threshold value as the function of the ambient temperature is formed by a step function with a constant value when the measured ambient temperature is smaller than a first set value; a higher constant value for an ambient temperature that is larger than a second set value which is larger than the first set value; and a rising function between said set values; and wherein a course of the rising function of the maximum threshold value is steeper than a course of the rising function of the minimum threshold value.

2. The method according to claim 1, wherein the gas to be dried originates from the compressor and the ambient temperature is measured near the inlet of the compressor.

3. The method according to claim 1, wherein the lowest gas temperature or the dew point of the gas to be dried is measured near the outlet of the secondary part of the heat exchanger.

4. The method according to claim 1, wherein the rising function of the minimum threshold value is linear.

5. The method according to claim 4, wherein the linear rising function of the minimum threshold value is such that the difference between the measured ambient temperature and the calculated minimum threshold value is constant.

6. The method according to claim 5, wherein between the set values, the difference between the ambient temperature and the calculated minimum threshold value is at least 10° Celsius.

7. The method according to claim 1, wherein the rising function of the maximum threshold value is linear.

8. The method according to claim 1, wherein a selected minimum time interval is taken into account before the cooling circuit can be started again after it is switched off.

* * * * *